United States Patent
Hung

(10) Patent No.: US 8,901,478 B2
(45) Date of Patent: Dec. 2, 2014

(54) OPTICAL FIBER ASSEMBLY CAPABLE OF DETECTING LIGHT INTENSITY

(71) Applicant: Yi Hung, New Taipei (TW)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/660,960

(22) Filed: Oct. 25, 2012

(65) Prior Publication Data
US 2014/0027624 A1    Jan. 30, 2014

(30) Foreign Application Priority Data
Jul. 24, 2012 (TW) .............................. 101126557 A

(51) Int. Cl.
*G01J 1/04* (2006.01)
(52) U.S. Cl.
USPC ..................................... 250/227.11; 250/205
(58) Field of Classification Search
USPC ....................... 250/227.11, 205; 356/427, 445
See application file for complete search history.

(56) References Cited

U.S. PATENT DOCUMENTS

2006/0077390 A1* 4/2006 Kralik ........................... 356/427
2008/0030737 A1* 2/2008 Su et al. ......................... 356/445

\* cited by examiner

*Primary Examiner* — Seung C Sohn
(74) *Attorney, Agent, or Firm* — Novak Druce Connolly Bove + Quigg LLP

(57) ABSTRACT

An optical fiber assembly includes a prism, a light emitting element, an optical fiber, and a light detector. The prism includes an incident surface, an emergent surface, a first reflecting surface, a second reflecting surface, and a third reflecting surface. A collimating portion is positioned on the incident surface. The light emitting element faces the collimating portion for emitting light beams. The optical fiber faces the emergent surface. The light detector faces the incident surface. The collimating portion collimates the light beams to parallel first and second light beams. The first light beams are projected to the first reflecting surface, reflected to the emergent surface, and are reflected to the fiber optical. The second light beams are projected to the second reflecting surface, reflected to the third reflecting surface, and reflected to the light detector.

8 Claims, 3 Drawing Sheets

US 8,901,478 B2

OPTICAL FIBER ASSEMBLY CAPABLE OF DETECTING LIGHT INTENSITY

BACKGROUND

1. Technical Field

The present disclosure relates to optical fiber assemblies and, particularly, to an optical fiber assembly capable of detecting light intensity.

2. Description of Related Art

An optical fiber assembly includes a light emitting element, an optical fiber, and a prism. The prism includes a reflecting surface which is positioned in a light path between the light emitting element and the optical fiber. In use, the light emitting element emits light beams, the reflecting surface reflects the light beams to the optical fiber and thus to external optical elements. The light beams may be attenuated at the reflecting surface. However, the optical fiber assembly cannot detect light intensity of the light beams reflected off the prism and determine if the attenuation of the light beams is acceptable.

Therefore, it is desirable to provide an optical fiber assembly, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
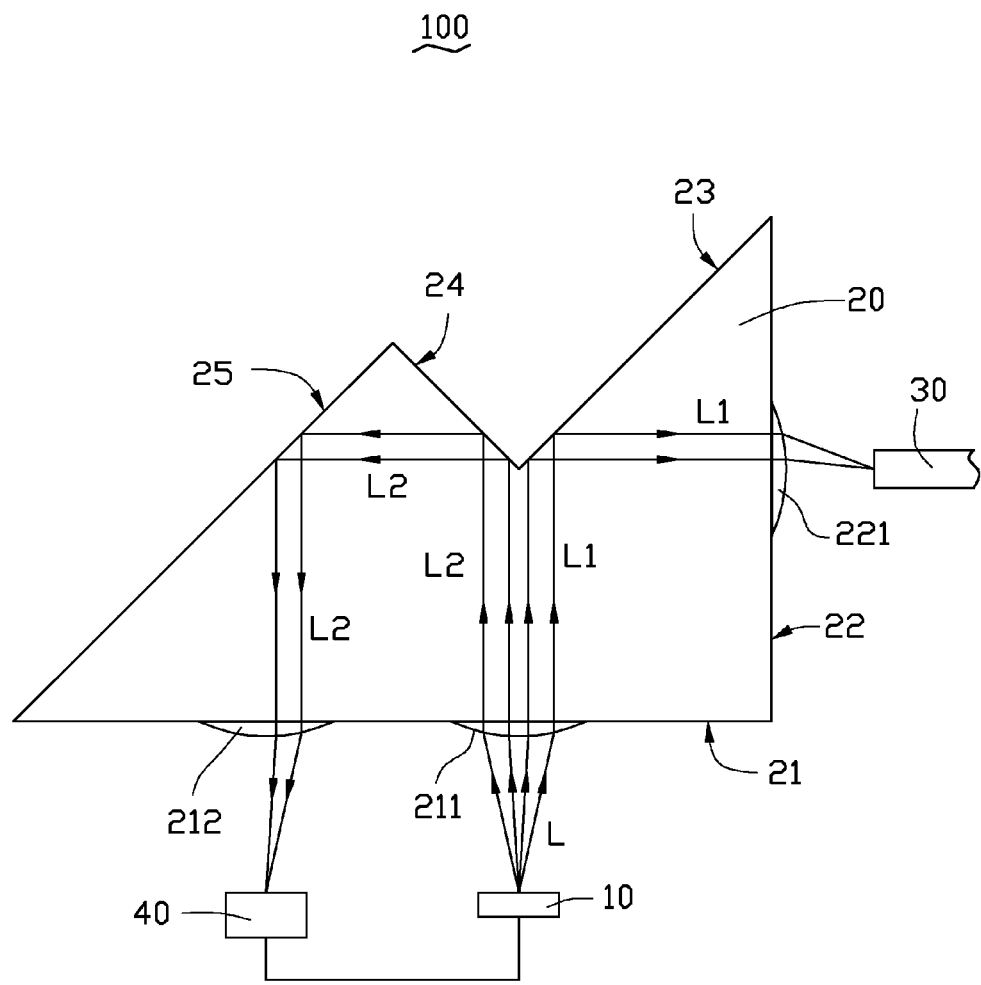
FIG. 1 is a cross-sectional view of an optical fiber assembly, according to an exemplary embodiment.

Referring to FIG. 1, an optical fiber assembly 100, according to an embodiment, is shown. The optical fiber assembly 100 includes a light emitting element 10, a prism 20, an optical fiber 30, and a light intensity detector 40.

The light emitting element 10 can be a laser light source or a light emitting diode (LED) light source. In the embodiment, the light emitting element 10 is a vertical-cavity surface emitting laser (VCSEL) light source. The light emitting element 10 is used to emit light beams L and project the light beams L to the prism 20.

The prism 20 includes an incident surface 21, an emergent surface 22, a first reflecting surface 23, a second reflecting surface 24, and a third reflecting surface 25. The incident surface 21, the emergent surface 22, the first reflecting surface 23, the second reflecting surface 24, and the third reflecting surface 25 are sequentially connected to each other. The emergent surface 22 is perpendicular to the incident surface 21. The first reflecting surface 23 connects with the emergent surface 22 and an included angle between the first reflecting surface 23 and the emergent surface 22 is about 45 degrees. The second reflecting surface 24 is perpendicularly connected to the first reflecting surface 23. The third reflecting surface 25 is perpendicularly connected to the second reflecting surface 24. The third reflecting surface 25 also connects with the incident surface 21 and an included angle between the third reflecting surface 25 and the incident surface 21 is about 45 degrees.

Figure 2:
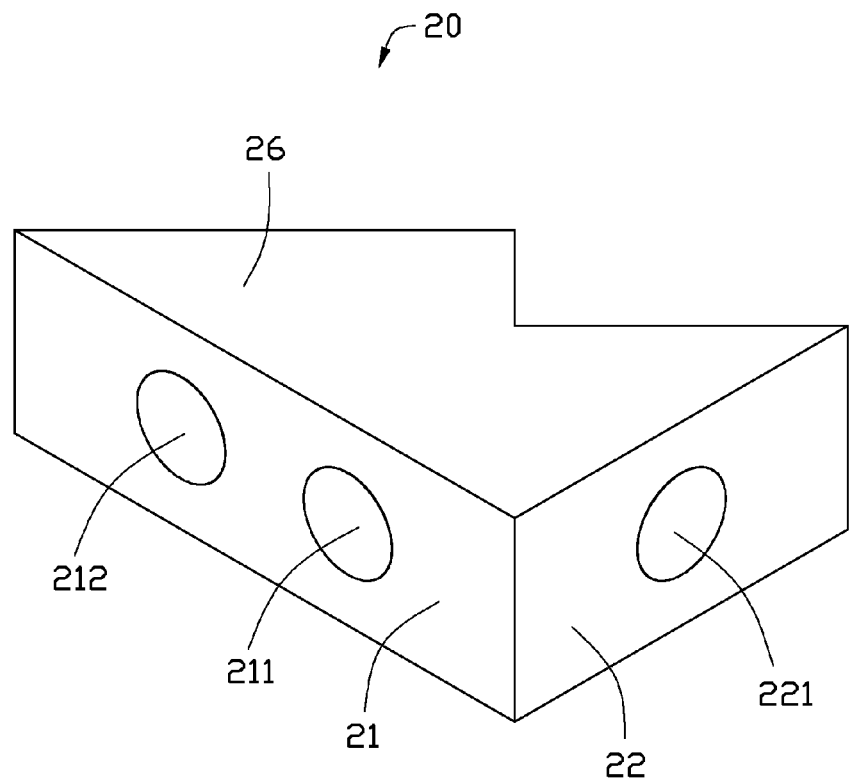
FIG. 2 is an isometric schematic view of a prism of the optical fiber assembly of FIG. 1.
Figure 3:
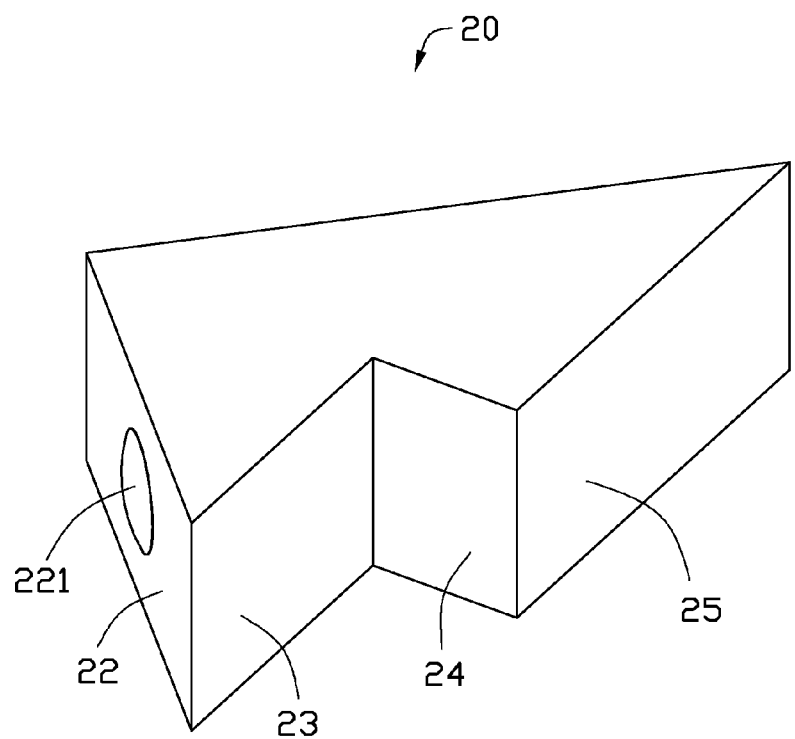
FIG. 3 is similar to FIG. 2, but viewed from another angle.

Referring to FIGS. 2 and 3, the prism 20 further includes a pair of side surfaces 26 opposite to each other. The side surfaces 26 are perpendicular to the incident surface 21, the emergent surface 22, the first reflecting surface 23, the second reflecting surface 24, and the third reflecting surface 25. A first collimating portion 211 and a second collimating portion 212 are positioned on the incident surface 21. In the embodiment, the first collimating portion 211 and the second collimating portion 212 are integrally formed with the prism 20. The first collimating portion 211 is distanced from the second collimating portion 212. In the embodiment, the first collimating portion 211 and the second collimating portion 212 are formed as convex lenses. An optical axis of the first collimating portion 211 is parallel to the emergent surface 22 and meets with an intersection of the first reflecting surface 23 and the second reflecting surface 24. The light emitting element 10 faces the first collimating portion 211 and a central axis of the light emitting element 10 is coaxial with the optical axis of the first collimating portion 211.

An optical axis of the second collimating portion 212 is perpendicular to the incident surface 21 and intersects with the third reflecting surface 25. The light intensity detector 40 is electrically connected to the light emitting element 10 and faces and aligns with the second collimating portion 212. The light intensity detector 40 is used to detect light intensity.

A third collimating portion 221 is formed on the emergent surface 22. In the embodiment, the third collimating portion 221 is also a convex lens integrally formed with the prism 20. An optical axis of the third collimating portion 221 is perpendicular to the emergent surface 22 and intersects with the first reflecting surface 23. One end of the optical fiber 30 faces and aligns with the third collimating portion 221.

In use, the light emitting element 10 projects the light beams L into the first collimating portion 211. The first collimating portion 211 collimates the light beams L and forms first light beams L1 and second light beams L2 which are perpendicular to the incident surface 21. The first light beams L1 strike the first reflecting surface 23 and are reflected to the third collimating portion 221 by the first reflecting surface 23. The first light beams L1 are converged by the third collimating portion 221 and then projected to the optical fiber 30. The second light beams L2 strike the second reflecting surface 24 and are reflected to the third reflecting surface 25 by the second reflecting surface 24. Then the second light beams L2 are reflected to the second collimating portion 212 by the third reflecting surface 25. Finally, the second light beams L2 are converged by the second collimating portion 212 and projected to the light intensity detector 40. The light detector 40 detects light intensity of the second light beams L2 and determines if the light intensity of the second light beams L2 satisfies a predetermined level of intensity.

In the embodiment, the optical axis of the first collimating portion 211 is parallel to the emergent surface 22 and meets the intersection the first reflecting surface 23 and the second reflecting surface 24. Half of the light beams L are projected to the first reflecting surface 23 and the other half of the light beams L are projected to the second reflecting surface 24. Therefore, a light intensity ratio of the first light beams L1 and the second light beams L2 is 1:1. That is, the light intensity of the first light beams L1 is equal to a light intensity of the second light beams L2. Therefore, a determination can be made as to whether a light intensity of the first light beams L1 satisfies the predetermined level of intensity simply through detecting the light intensity of the second light beams L2.

The light intensity detector 40 further feeds back the light intensity of the second light beams L2 to the light emitting element 10, such that the light emitting element 10 can adjust a light intensity of the light beams L to intensify or weaken the first light beams L1 to satisfy the predetermined level of intensity.

In alternative embodiments, the second collimating portion 212 and the third collimating portion 221 are omitted. The light intensity detector 40 directly faces the incident surface 21 to receive the second light beams L2. The optical fiber 30 directly faces the emergent surface 22 to receive the first light beams L1.

In alternative embodiments, each of the first collimating portion 211, the second collimating portion 212, and the third collimating portion 221 are separately manufactured and adhesively attached to the incident surface 21 and to the emergent surface 22.

In alternative embodiments, each of the first collimating portion 211, the second collimating portion 212, and the third collimating portion 221 can be a Fresnel lens.

In alternative embodiments, the light intensity ratio of the first light beams L1 and the second light beams L2 is not limited to a straight 1:1 ratio but can be other ratios by adjusting the position of the first collimating portion 211 relative to the intersection of the first reflecting surface 23 and the second reflecting surface 24. For example, the light intensity ratio of the first light beams L1 and the second light beams L2 can be 2:1, where the light intensity of the first light beams L1 is equal to twice the light intensity of the second light beams L2. The light intensity of the first light beams L1 can be calculated through the light intensity of the second light beams L2 and the light intensity ratio.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical fiber assembly, comprising:
    a prism comprising an incident surface, an emergent surface, a first reflecting surface, a second reflecting surface, and a third reflecting surface; the incident surface, the emergent surface, the first reflecting surface, the second reflecting surface, and the third reflecting surface sequentially connected to each other;
    a first collimating portion positioned on the incident surface;
    a light emitting element facing and aligning with the first collimating portion and configured for emitting light beams;
    an optical fiber facing and aligning with the emergent surface; and
    a light detector facing and aligning with the incident surface;
    wherein the first collimating portion is configured for collimating the light beams into a first light beams and a second light beams parallel to the first light beams, the first light beams are projected to the first reflecting surface, reflected to the emergent surface by the first reflecting surface, and reflected to the optical fiber by the first reflecting surface; the second light beams are projected to the second reflecting surface, reflected to the third reflecting surface by the second reflecting surface, and reflected to the light detector by the third reflecting surface, the light detector is configured for detecting a light intensity of the second light beams, a light intensity of the first light beams is determined by the light intensity of the second light beams and an intensity ratio of the first light beams and the second light beams.

2. The optical fiber assembly of claim 1, wherein the emergent surface is perpendicular to the incident surface, the first reflecting surface connects with the emergent surface and an included angle between the first reflecting surface and the emergent surface is about 45 degrees, the second reflecting surface is perpendicularly connected to the first reflecting surface, the third reflecting surface is perpendicularly connected to the second reflecting surface, the third reflecting surface connects with the incident surface and an included angle between the third reflecting surface and the incident surface is about 45 degrees.

3. The optical fiber assembly of claim 2, wherein the prism comprises a second collimating portion positioned on the incident surface, the second collimating portion faces and aligns with the light detector and is configured for converging the second light beams reflected from the third reflecting surface.

4. The optical fiber assembly of claim 3, wherein the prism comprises a third collimating portion positioned on the emergent surface, the third collimating portion faces and aligns with the optical fiber and is configured for converging the first light beams reflected from the first reflecting surface.

5. The optical fiber assembly of claim 4, wherein the first collimating portion, the second collimating portion, and the third collimating portion are convex lenses.

6. The optical fiber assembly of claim 4, wherein the first collimating portion, the second collimating portion, and the third collimating portion are Fresnel lenses.

7. The optical fiber assembly of claim 1, wherein the intensity ratio of the first light beams and the second light beams is 1:1.

8. The optical fiber assembly of claim 1, wherein the prism comprises a pair of side surfaces opposite to each other, the side surfaces are perpendicular to the incident surface, the emergent surface, the first reflecting surface, the second reflecting surface, and the third reflecting surface.

* * * * *